US007559583B2

(12) United States Patent
Stoetzer

(10) Patent No.: US 7,559,583 B2
(45) Date of Patent: Jul. 14, 2009

(54) TUBE COUPLING FOR TUBE ELEMENTS

(75) Inventor: Erwin Stoetzer, Aichach (DE)

(73) Assignee: Bauer Maschinen GmbH, Schrobenhausen (DE)

( * ) Notice: Subject to any disclaimer, the term of this patent is extended or adjusted under 35 U.S.C. 154(b) by 72 days.

(21) Appl. No.: 11/790,371

(22) Filed: Apr. 25, 2007

(65) Prior Publication Data
US 2007/0254516 A1     Nov. 1, 2007

(30) Foreign Application Priority Data
Apr. 26, 2006    (EP)   ................................... 06008685

(51) Int. Cl.
*F16L 37/24*     (2006.01)
(52) U.S. Cl. .................. 285/403; 285/90; 285/330; 285/374; 285/404
(58) Field of Classification Search ................. 285/330, 285/374, 376–377, 399, 401, 403–404, 90, 285/123.13
See application file for complete search history.

(56) References Cited

U.S. PATENT DOCUMENTS 2,075,483 A    3/1937    Trotter
2,750,569 A *   6/1956    Moon .......................... 439/194
3,345,087 A *   10/1967   Hanes et al. ................... 285/39
4,138,148 A *   2/1979    Zaremba ..................... 285/317
4,697,947 A    10/1987   Bauer et al.

FOREIGN PATENT DOCUMENTS

| DE | 90 01 766 U1 | 4/1990 |
| DE | 195 27 990 C1 | 8/1996 |
| GB | 1 275 443 A | 5/1972 |

* cited by examiner

*Primary Examiner*—Aaron M Dunwoody
*Assistant Examiner*—Fannie Kee
(74) *Attorney, Agent, or Firm*—Jacobson Holman PLLC

(57) ABSTRACT

A tube coupling for tube elements comprising a socket and a plug which can be inserted axially into the socket. The tube coupling has a joining portion for producing a torque proof junction between the socket and the plug as well as a securing portion for securing the axial-position of the plug in the socket. The securing of the axial position is brought about by two corresponding annular grooves, into which at least one locking element can be inserted via an insertion opening in order to produce a form-locking connection. To secure the locking element a plurality of radial bores is provided on the inner annular groove, into which a securing bolt can be inserted.

5 Claims, 4 Drawing Sheets

TUBE COUPLING FOR TUBE ELEMENTS

CROSS-REFERENCE TO RELATED APPLICATIONS (Not Applicable)

STATEMENT REGARDING FEDERALLY SPONSORED RESEARCH OR DEVELOPMENT (Not Applicable)

REFERENCE TO A SEQUENCE LISTING, A TABLE, OR A COMPUTER PROGRAM (Not Applicable)

BACKGROUND OF THE INVENTION (1) Field of the Invention

The invention relates to a tube coupling for tube elements. The employment of tube elements for both the transmission of forces, especially torques, and the passage of fluids is known. Such a procedure may prove to be of advantage for instance in mixing devices, in which a hollow shaft serves to introduce fluids into a reaction space on the one hand and supports elements for agitating the reaction space on the other hand.

(2) Description of Related Art Including Information Disclosed Under 37 CFR 1.97 and 1.98

To connect several tubes of such kind screw couplings are known, in which case radial bolts may perhaps be provided for securing the screw couplings.

However, when making use of aggressive fluids and/or under aggressive reactive conditions the reliability of such screw connections may suffer, especially if corrosion and/or deposits lead to a geometrical alteration of the screw threads. The consequence can be that the tube coupling can be detached only with great difficulty and the tube elements can only be exchanged to a limited degree.

The object of the invention is to provide a detachable, force-transmitting tube coupling that has a particularly high reliability.

The object is solved in accordance with the invention by a tube coupling for first and second tube elements. The tube coupling includes a socket having a connecting portion for the first tube element and at least one insertion opening, a plug which can be inserted axially into the socket and having a connecting portion for the a second tube element, a joining portion for a torque proof junction comprising at least one axial rib arranged in the socket and/or on the plug and at least one corresponding axial groove arranged on the plug or in the socket, at least one locking element, a securing portion for securing the position of the plug inside the socket, the securing portion having a first annular groove formed in the socket and a corresponding second annular groove formed on the plug, wherein the at least one locking element can be inserted into the two annular grooves via the at least one insertion opening in order to produce a form-locking connection between the socket and the plug, the locking element being designed as a curved, approximately cuboid wedge, a securing bolt, a stop forming part of the locking element and projecting radially outwards, and a plurality of evenly spaced radial bores located in the annular groove of the plug for accommodating the securing bolt in order to secure the position of the locking element.

BRIEF SUMMARY OF THE INVENTION

The invention resides in a tube coupling for tube elements comprising a socket having a connecting portion for a first tube element, a plug which can be inserted axially into the socket and has a connecting portion for a second tube element, a joining portion for a torque proof junction comprising at least one axial rib arranged on the socket and/or the plug and at least one corresponding axial groove arranged on the plug or the socket, a securing portion for securing the axial position having a first annular groove formed on the socket and a corresponding second annular groove formed on the plug, wherein at least one locking element can be inserted into the two annular grooves via at least one insertion opening in the socket in order to produce a form-locking connection between the socket and the plug, and a plurality of evenly to each other spaced radial bores located in the annular groove of the plug for accommodating a securing bolt in order to secure the position of the locking element.

A first fundamental idea of the invention can be seen in the separation of the means for the torque transmission and the means for the axial position-securing and for transmitting axial tensile forces. For the torque transmission a splined toothing with at least one axially extending groove is provided in a first axial portion of socket and plug, i.e. in the joining portion. Furthermore, in order to prevent an axial movement of the plug in the socket and therefore an uncoupling of the joining portion, a securing portion for securing the axial position is provided in accordance with the invention. In this securing portion annular grooves are provided on the socket and the plug, which are located opposite each other when the plug is inserted. To bring about the axial securing a locking element can be inserted into the two annular grooves, whereby a form-locking connection is produced between socket and plug.

According to another fundamental idea of the invention at least one insertion opening is provided on the socket in order to insert the locking element into the annular grooves. In accordance with the invention the insertion opening is provided externally on the socket, in particular in a peripheral portion of the socket so that a simple-insertion and removal is rendered possible for connecting and detaching the tube coupling from the outside.

According to a further aspect of the invention radial bores are provided in the annular groove of the plug in order to accommodate a securing bolt for the locking element. By inserting a bolt into the radial bores a movement of the locking element in the circumferential direction of the annular groove can be restricted and in particular prevention can be made of an undesirable dislodgement of the locking element from out of the insertion opening and/or reaching a part of the annular grooves, in which it is no longer accessible via the insertion opening. According to the invention a plurality of evenly to each other spaced radial bores is provided, which allows for a particularly reliable securing of the locking element. The arrangement of several evenly to each other spaced radial bores is especially advantageous if the joining portion permits a coupling at several different evenly to each other spaced angular positions.

As a result of the axial separation of joining portion and securing portion the susceptibility with regard to geometrical alterations caused for example by corrosion or deposits is reduced. Moreover, the spatial separation also permits a particularly reliable sealing of the tube interior with respect to the tube exterior.

With regard to reliability and the amount of work involved in the production it is particularly advantageous that the joining portion for the torque proof junction is arranged on the socket between the securing portion for securing the axial position and the connecting portion for the tube element. Hence, the joining portion on the corresponding plug is arranged in closer axial proximity to the tip of the plug than the securing portion for the axial position-securing. Whilst keeping the amount of work involved to a minimum such an arrangement allows for an especially reliable sealing, in particular between the interior of the coupling and the securing portion for securing the axial position, which is in connection with the surrounding environment via the insertion opening.

The reliability of the tube coupling according to the invention can be enhanced further in that at least one annular sealing is arranged axially between the securing portion and the joining portion. Alternatively or additionally provision can be made for at least one annular sealing to be arranged on the side of the joining portion that faces away axially from the securing portion. By preference, the annular sealing arranged between securing portion and joining portion has a greater diameter than the annular sealing arranged on the side of the joining portion that faces away from the securing portion.

A securing of the axial position that is both of a particularly simple and reliable construction can be achieved in that the locking element is designed as a curved, approximately cuboid wedge. Such a wedge can be inserted in a particularly easy way through the insertion opening into the annular grooves and can be removed again. By preference, at least one pair of locking elements is used for the axial securing, in which case the two locking elements of the pair of locking elements are inserted into the annular grooves on opposite sides of the insertion opening. It is suitable for the securing bolt to be arranged centrally between the two locking elements so that it is able to secure both locking elements of a locking element pair at the same time.

Furthermore, in accordance with the invention it is of advantage that the locking element has a stop that projects radially outwards. More particularly, the stop can be designed such that it abuts against the wall of the insertion opening when the locking element is inserted. In this way the locking element can be prevented from slipping too far during its insertion into the annular grooves so that it is accessible through the insertion opening to a limited extent only. In addition, it is especially advantageous for the locking element to have at its front face a bevel that is directed towards the plug, i.e. in particular directed radially inwards. With such a bevel it is possible to insert the locking element in an inclined manner through the insertion opening, so that locking elements can be used with greater dimensions as compared to the insertion opening.

The production costs of the tube coupling according to the invention can be reduced further in that the socket has a first sleeve element, on which the joining portion is formed, and, arranged at the front face thereof, a second sleeve element, on which the connecting portion for the first tube element is provided in particular. The two sleeve elements can be connected in a force-locking, form-locking or integral manner. In an embodiment of such type the splined toothing in the joining portion can be produced in a particularly easy way by an axial pressing without the second sleeve element, which is attached subsequently, being a hindrance to this production process. In particular, the second sleeve element can have a smaller internal diameter as compared to the first sleeve element.

The tube coupling in accordance with the invention can be employed in a great variety of applications, in which both forces and fluids are to be transmitted via a tube. For instance the tube elements can serve to simultaneously introduce a substance into a working area and mix the substance with another substance in this working area. More particularly, the tube elements can be provided as drilling tubes for earth and rock drilling or as tubes for introducing construction materials, especially suspensions, into the soil. The tube elements can be combined to a drill rod.

BRIEF DESCRIPTION OF THE SEVERAL VIEWS OF THE DRAWINGS

In the following the invention will be described in greater detail by way of preferred embodiments, which are shown schematically in the Figures, wherein.

DETAILED DESCRIPTION OF THE INVENTION

Figure 1:
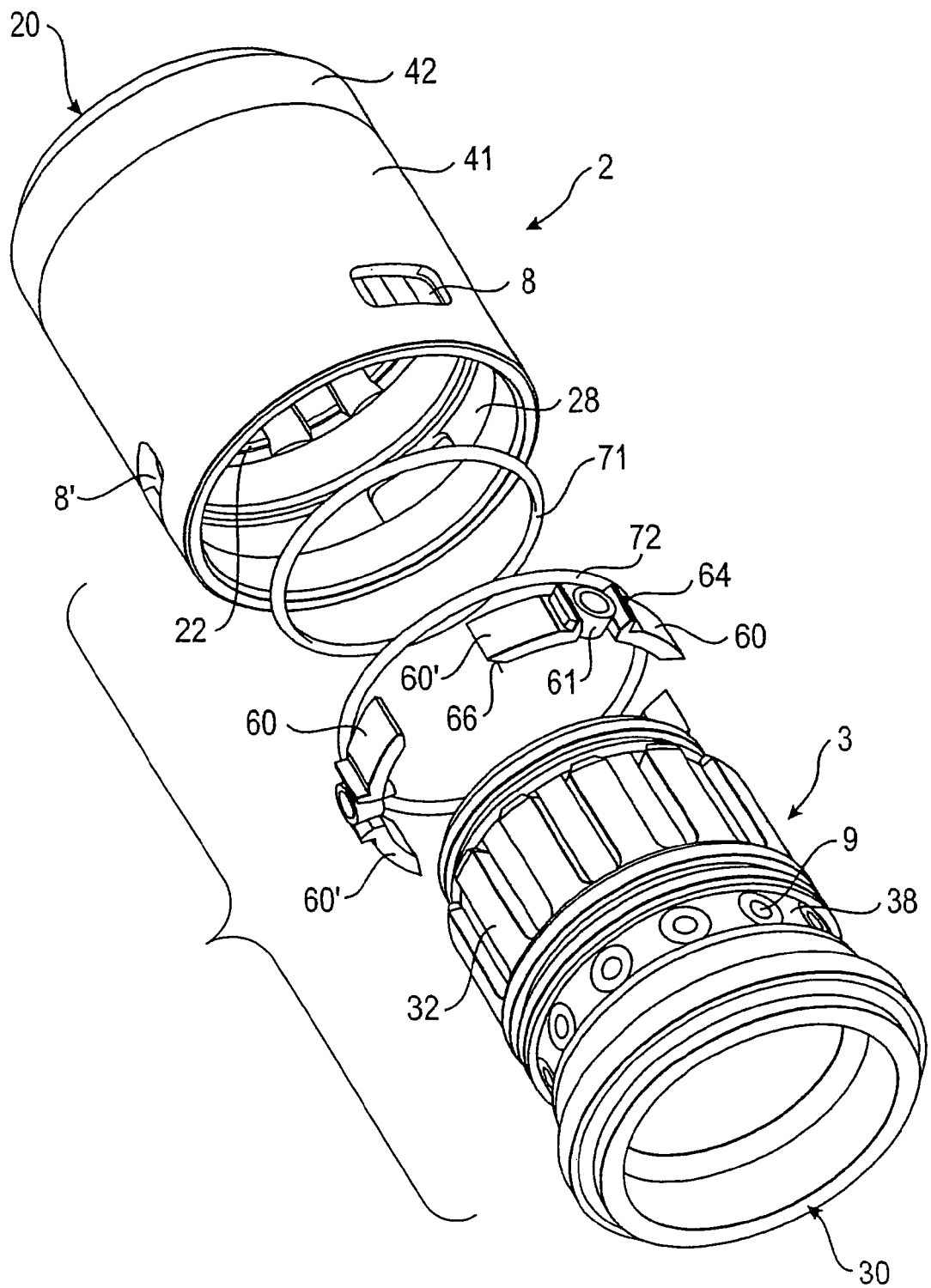
FIG. 1 shows a perspective view of a tube coupling according to the invention in exploded illustration.

In describing preferred embodiments of the present invention illustrated in the drawings, specific terminology is employed for the sake of clarity. However, the invention is not intended to be limited to the specific terminology so selected, and it is to be understood that each specific element includes all technical equivalents that operate in a similar manner to accomplish a similar purpose.

Figure 2:
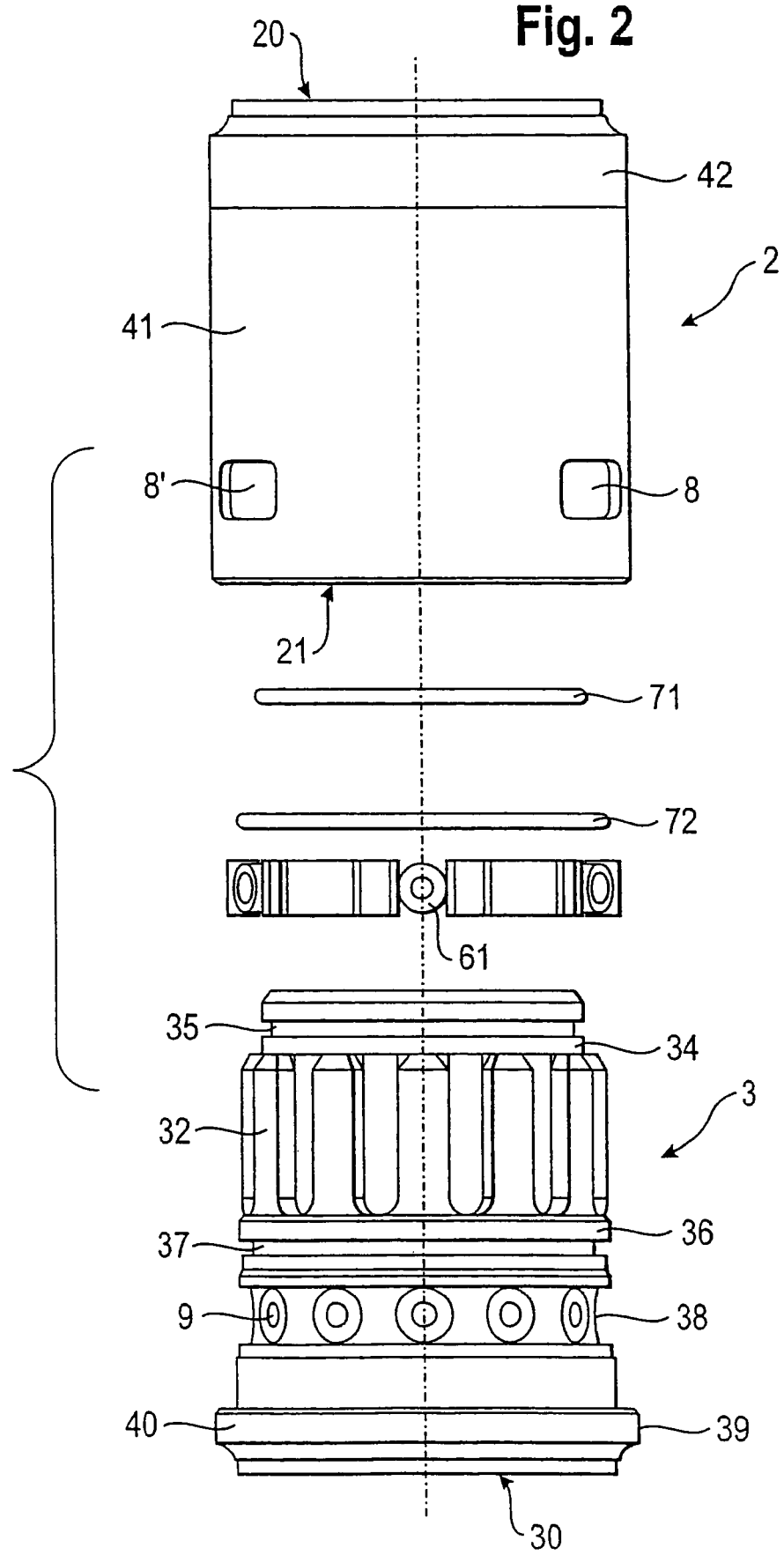
FIG. 2 shows a side view of the tube coupling from FIG. 1 in exploded illustration.
Figure 3:
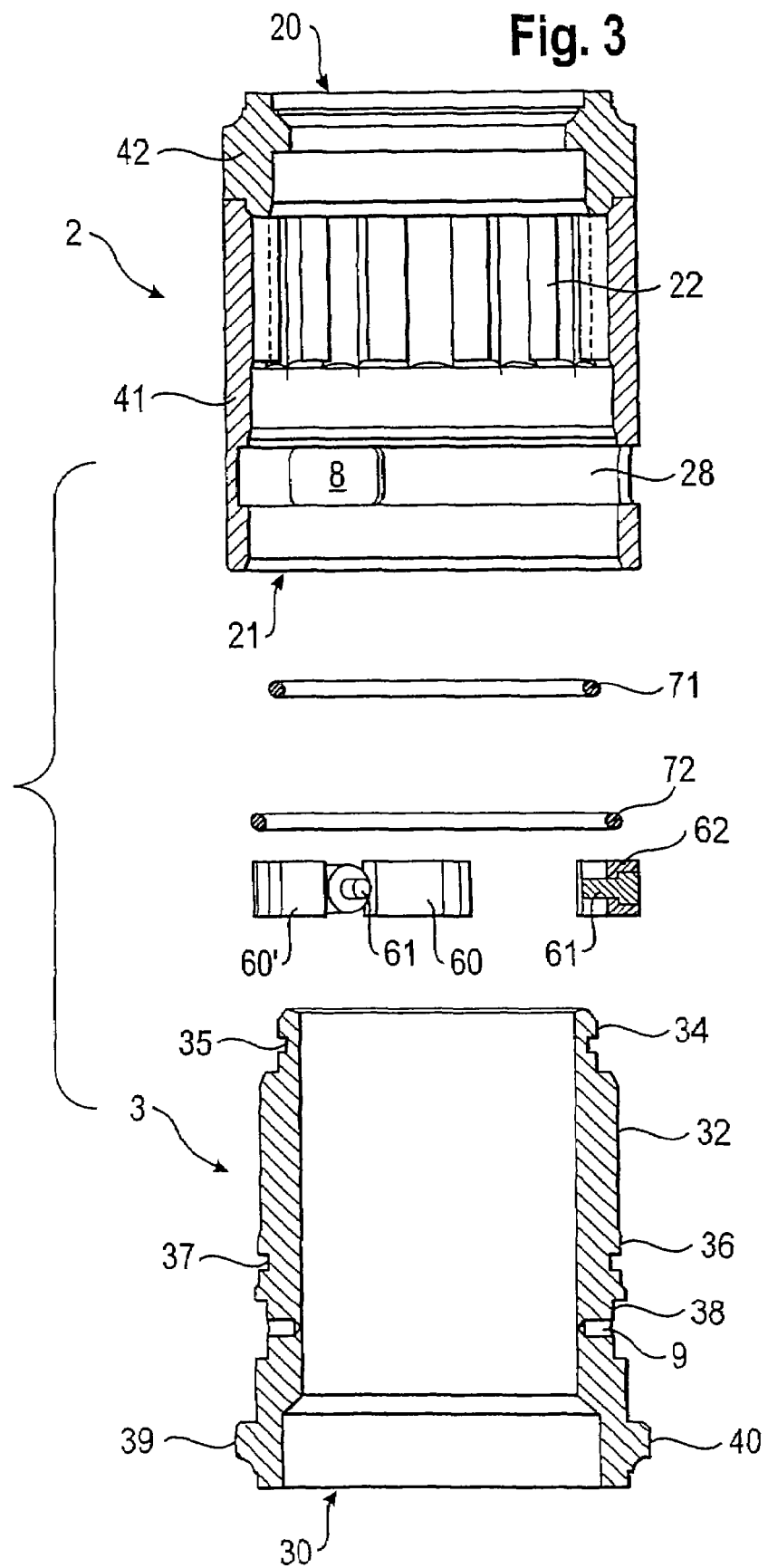
FIG. 3 shows a longitudinally sectional view of the tube coupling from FIG. 1 in exploded illustration.

An embodiment of a tube coupling according to the invention is shown in different views in FIGS. 1 to 3. The tube coupling has a cylindrical socket 2, at the front face of which a connecting portion 20 is provided for a first tube element not depicted here. Furthermore, the tube coupling has a sleeve-like plug 3, on the opposite lying front face of which a connecting portion 30 is provided for a second tube element not depicted here either. By preference, the tube elements are welded to the connecting portions 20, 30. To establish a tube connection the plug 3 can be inserted into the socket 2.

Starting in the axial direction from the tip of the plug 3 it has a first cylindrical portion 34, in which an annular sealing groove 35 is provided to accommodate a first annular sealing ring 71. In the axial direction the first cylindrical portion 34 is followed by a splined toothing 32 having a plurality of axial ribs and axial grooves that form the joining portion for the torque proof junction. In the part of the axial ribs the plug 3 is designed with a greater external diameter than in the first cylindrical portion 34.

In the axial direction the splined toothing 32 is followed by a second cylindrical portion 36, in which provision is made for a second annular sealing groove 37 in order to accommodate a second annular sealing ring 72. The external diameter of the plug 3 in the second cylindrical portion 36 corresponds approximately to the external diameter of the plug 3 in the portion of the ribs of the splined toothing 32. Accordingly, the second annular sealing ring 72 is designed with a greater diameter than the first annular sealing ring 71.

The second cylindrical portion 36 is followed axially by an annular groove 38 that serves to secure the axial position of the tube coupling. This annular groove 38 is followed by a third cylindrical portion 39, on which a ring-shaped stop 40 is provided. In the part of the third cylindrical portion 39 the connecting portion 30 of the second tube element is provided.

The inner wall of socket 2 is designed corresponding to the outer wall of the plug 3. Starting from a plug-in opening 21 for the plug 3 a further annular groove 28 is first of all provided on the inner wall of the socket 2, which lies opposite the annular groove 38 of the plug 3 when the plug 3 is inserted completely, i.e. as far as to the stop 40. Along the annular groove 28 several approximately rectangular insertion openings 8, 8' are provided in an evenly distributed manner in the cylindrical outer wall of the socket 2, which permit access to the annular groove 28 from outside. Through these openings locking elements 60 can be introduced from outside into the annular groove 28 as well as into the corresponding annular groove 38, by means of which the plug 3 is secured axially in the socket 2.

Starting from the plug-in opening 21 the annular groove 28 is followed in the axial direction by an internal splined toothing 22 that corresponds to the splined toothing 32 of the plug 3.

For particularly easy production of the splined toothing 22, the socket is designed in two parts having a first sleeve element 41, in which the splined toothing 22 is provided, and a second sleeve element 42. The sleeve element 42 that has a smaller internal diameter adjoins at its front face onto the splined toothing 22 and is connected to the first sleeve element 41 in an integral manner for example.

For especially good axial securing, locking element pairs are provided in accordance with the illustrated embodiment, which each include two individual locking elements 60, 60' that are inserted in the opposite sense of rotation into the two annular grooves 28, 38 on either side of the insertion openings 8, 8'. To secure the individual locking elements 60, 60' in the annular grooves 28, 38 securing bolts 61 are provided that can be introduced into corresponding radial bores 9 in the annular groove 38 of the plug 3. Said radial bores 9 are distributed with the same distance apart along the circumference of the annular groove 38. On the securing bolts 61 retaining sockets 62 consisting of plastic are arranged, by means of which the locking elements 60 can be fixed in a force-locking and/or form-locking manner. Basically other securing concepts are also conceivable besides the use of securing bolts 61 and radial bores 9.

Figure 4:
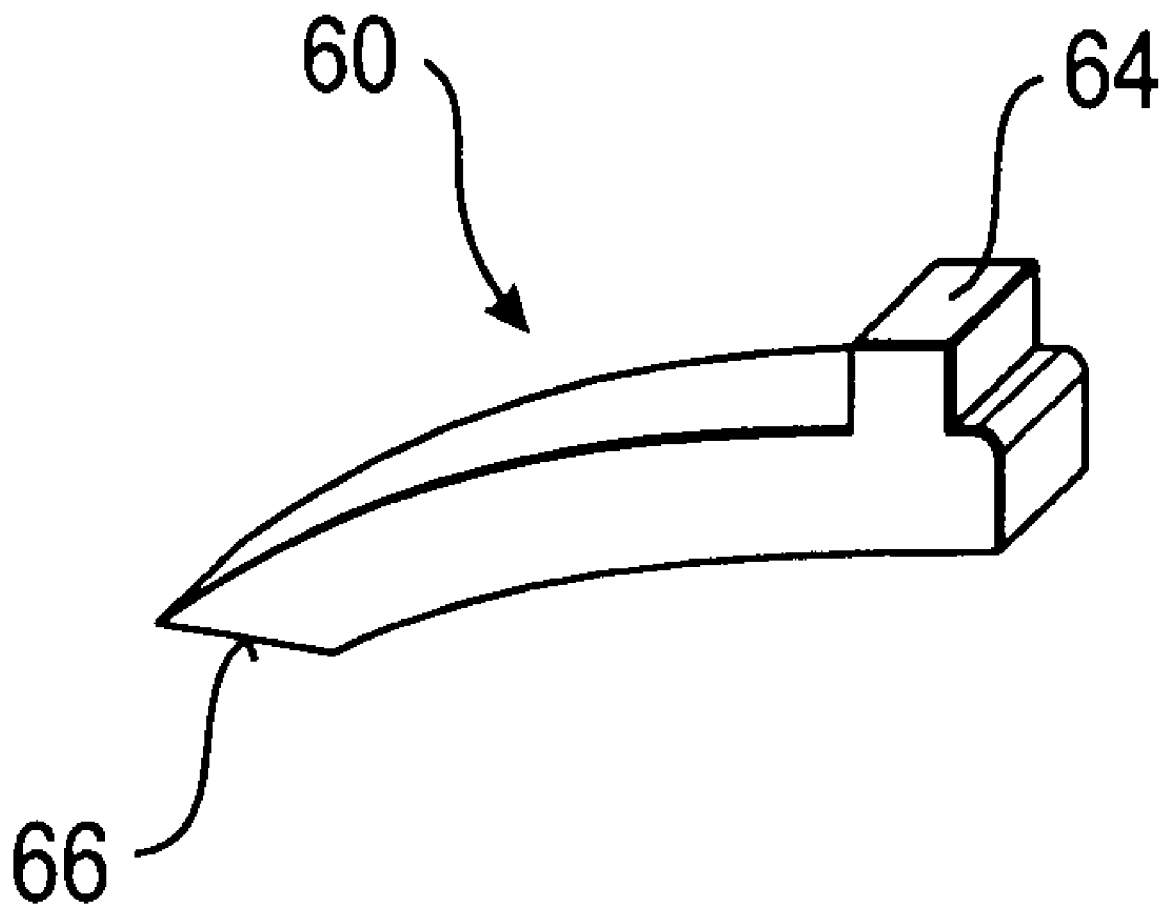
FIG. 4 shows a perspective view of a locking element for use in a tube coupling according to the invention.

Constructional details of the locking elements 60 can be gathered from FIG. 4 in particular. The locking elements 60 are designed in a ring-segmented manner and have a stop 64 in proximity to their one front face, which projects radially outwards. Through this stop that abuts against the wall surrounding the insertion opening 8, 8' the respective locking element 60 can be prevented from slipping too far into the two annular grooves 28, 38. On the opposite front face the locking elements 60 have a bevel 66 that is directed radially inwards, i.e. towards the plug 3. The bevel 66 renders it possible that the respective locking element 60 is positioned during the insertion into the annular groove 38 of the plug 3, whereby the insertion process is facilitated.

It is to be understood that the present invention is not limited to the illustrated embodiments described herein. Various types and styles of user interfaces may be used in accordance with the present invention without limitation. Modifications and variations of the above-described embodiments of the present invention are possible, as appreciated by those skilled in the art in light of the above teachings. It is therefore to be understood that, within the scope of the appended claims and their equivalents, the invention may be practiced otherwise than as specifically described.

The invention claimed is:

1. A tube coupling for first and second tube elements comprising:
    a socket having a connecting portion for the first tube element and at least one insertion opening,
    a plug which can be inserted axially into the socket and having a connecting portion for the second tube element,
    a joining portion for a torque proof junction comprising at least one axial rib arranged in the socket and/or on the plug and at least one corresponding axial groove arranged on the plug or in the socket,
    at least one locking element,
    a securing portion for securing the position of the plug inside the socket, the securing portion having a first annular groove formed in the socket and a corresponding second annular groove formed on the plug, wherein the at least one locking element can be inserted into the two annular grooves via the at least one insertion opening in order to produce a form-locking connection between the socket and the plug, the locking element being designed as a curved, approximately cuboid wedge,
    a securing bolt,
    a stop forming part of the locking element and projecting radially outwards, and a plurality of evenly spaced radial bores located in the annular groove of the plug for accommodating the securing bolt in order to secure the position of the locking element.

2. The tube coupling according to claim 1, wherein the joining portion for the torque proof junction is arranged on the socket between the securing portion for securing the axial position and the connecting portion for the tube element.

3. The tube coupling according to claim 1, wherein at least one annular sealing ring is arranged axially between the securing portion and the joining portion and/or in that at least one further annular sealing ring is arranged on the side of the joining portion that faces away axially from the securing portion.

4. The tube coupling according to claim 1, wherein at its front face the locking element has a bevel directed towards the plug.

5. The tube coupling according to claim 1, wherein the socket has a first sleeve element, on which the joining portion is formed and, wherein the first sleeve element has a front face at which is arranged a second sleeve element, providing the connecting portion for the first tube element.

* * * * *